United States Patent
Nyamwange et al.

(10) Patent No.: US 12,346,887 B2
(45) Date of Patent: Jul. 1, 2025

(54) HYPERSPECTRAL IMAGING SYSTEMS AND METHODS FOR ELECTRONIC AUTHENTICATION RESOURCE TRANSFERS

(71) Applicant: BANK OF AMERICA CORPORATION, Charlotte, NC (US)

(72) Inventors: Elvis Nyamwange, Little Elm, TX (US); Brian Neal Jacobson, Los Angeles, CA (US); Vismay Mandloi, Kendall Park, NJ (US); Donna Lee Phillips, Elkton, MD (US); Madhukiran Bangalore Ramachandra, San Ramon, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 55 days.

(21) Appl. No.: 17/964,624

(22) Filed: Oct. 12, 2022

(65) Prior Publication Data

US 2024/0127200 A1   Apr. 18, 2024

(51) Int. Cl.
*G06Q 20/10*   (2012.01)
*G06F 21/45*   (2013.01)
(Continued)

(52) U.S. Cl.
CPC ............. *G06Q 20/10* (2013.01); *G06F 21/45* (2013.01); *G06Q 20/38215* (2013.01); *G06Q 20/4014* (2013.01); *G06Q 2220/00* (2013.01)

(58) Field of Classification Search
CPC .. G06Q 20/4016; G06Q 20/042; G06Q 20/10; G06Q 20/38215; G06Q 20/4014;
(Continued)

(56) References Cited

U.S. PATENT DOCUMENTS 6,495,818 B1   12/2002   Mao
6,722,699 B2   4/2004   Patton et al.
(Continued)

FOREIGN PATENT DOCUMENTS

CA   2507185 A1   4/2006
WO   2013184226 A1   12/2013
(Continued)

OTHER PUBLICATIONS

Chein-I Chang, Hyperspectral Data Exploitation Theory and Application, 2007, https://onlinelibrary.wiley.com/doi/pdf/10.1002/0470124628#page=28 (Year: 2007).*
(Continued)

*Primary Examiner* — Neha Patel
*Assistant Examiner* — Chunling Ding
(74) *Attorney, Agent, or Firm* — Moore & Van Allen PLLC; Michael M. McCraw

(57) ABSTRACT

Systems, methods, and computer program products are provided herein for hyperspectral imaging based electronic authentication resource transfers. An example method includes receiving a resource transfer request associated with at least a first user and receiving hyperspectral image data associated with the first user. The method further includes extracting, via a hyperspectral imaging module, one or more account credentials of the first user from the hyperspectral image data. The method also includes effectuating the resource transfer associated with an account of the first user as defined by the one or more account credentials. The hyperspectral image data may be generated in response to an image capturing operation performed by the hyperspectral imaging module and may be indicative of a hyperspectral image supported by a resource transfer object.

20 Claims, 5 Drawing Sheets

(51) Int. Cl.
  *G06Q 20/38*   (2012.01)
  *G06Q 20/40*   (2012.01)
(58) Field of Classification Search
  CPC ............ G06Q 2220/00; G06Q 20/102; G06Q 20/1085; G06Q 20/18; G06Q 20/20; G06Q 20/204; G06Q 20/34; G06Q 20/3821; G01J 3/2823; G06F 21/30; G06F 21/45; G06T 7/0002; G06T 2207/10036; G06V 10/44; G06V 10/60; G06V 10/761
  See application file for complete search history.

(56) References Cited

U.S. PATENT DOCUMENTS

| | | |
|---|---|---|
| 7,149,366 B1 | 12/2006 | Sun |
| 7,599,544 B2 | 10/2009 | Moshe |
| 7,835,002 B2 | 11/2010 | Muhammed et al. |
| 7,995,196 B1 | 8/2011 | Fraser |
| 8,935,747 B2 | 1/2015 | Hatakeyama |
| 9,002,113 B2 | 4/2015 | Moshe |
| 9,646,295 B1* | 5/2017 | Kanuganti .......... G06Q 20/202 |
| 10,607,285 B2 | 3/2020 | Johnsrud et al. |
| 10,861,143 B2 | 12/2020 | Kim et al. |
| 11,562,357 B2 | 1/2023 | Thomas et al. |
| 2002/0046169 A1 | 4/2002 | Keresman, III et al. |
| 2005/0254709 A1 | 11/2005 | Geshwind et al. |
| 2008/0040261 A1 | 2/2008 | Nix et al. |
| 2010/0082481 A1* | 4/2010 | Lin .................... G06Q 20/3278 |
| | | 705/41 |
| 2012/0030105 A1* | 2/2012 | Jones .................. G06Q 20/108 |
| | | 705/45 |
| 2013/0201342 A1 | 8/2013 | Skaff |
| 2013/0235178 A1 | 9/2013 | Wang |
| 2014/0193078 A1* | 7/2014 | Robinson ............. G01J 3/2823 |
| | | 382/191 |
| 2015/0142461 A1 | 5/2015 | Darty |
| 2016/0086380 A1* | 3/2016 | Vayser .................. A61B 90/36 |
| | | 345/633 |
| 2017/0293913 A1* | 10/2017 | Gulak .................... G16H 10/40 |
| 2018/0047258 A1* | 2/2018 | Baughman ............. G09F 19/00 |
| 2019/0066113 A1* | 2/2019 | Gupta .................. G06Q 20/351 |
| 2020/0160286 A1* | 5/2020 | Vukich ................ G06Q 20/382 |
| 2023/0062938 A1* | 3/2023 | Murphy ............... G01N 21/359 |

FOREIGN PATENT DOCUMENTS

| | | | | |
|---|---|---|---|---|
| WO | WO-2014114952 A1 * | 7/2014 | ............ | G06F 21/42 |
| WO | WO-2018010736 A1 * | 1/2018 | ............ | G01J 3/0248 |
| WO | WO-2021250537 A1 * | 12/2021 | ............ | G01J 3/0202 |

OTHER PUBLICATIONS

Sarun Sumriddetchkajorn, Hyperspectral imaging-based credit card verifier structure with adaptive learning, Dec. 2008, https://opg.optica.org/ao/fulltext.cfm?uri=ao-47-35-6594&id=175164 (Year: 2008).*

Sumriddetchkajorn, Hyperspectral imaging-based credit card verifier structure with adaptive learning (Year: 2008).

* cited by examiner

HYPERSPECTRAL IMAGING SYSTEMS AND METHODS FOR ELECTRONIC AUTHENTICATION RESOURCE TRANSFERS

TECHNOLOGICAL FIELD

Example embodiments of the present disclosure relate generally to resource transfer systems and, more particularly, to systems and methods for securing and authenticating resource transfers via hyperspectral imaging techniques.

BACKGROUND

Resource transfer devices, objects, and systems are leveraged by a variety of industries in order to securely transmit resources (e.g., funds, information, etc.) between parties. For example, credit cards, debit cards, and other payment technologies (e.g., resource transfer objects) may, at least in part, operate to effectuate payment (e.g., transfer resources) between users, businesses, entities, and/or the like. Applicant has identified a number of deficiencies and problems associated with conventional resource transfer systems and associated methods. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for hyperspectral imaging based electronic authentication resource transfers. In one aspect, a hyperspectral imaging system for electronic authentication resource transfers is provided. The system may include at least one non-transitory storage device and at least one processor coupled to the at least one non-transitory storage device. The at least one processor may be configured to receive a resource transfer request associated with at least a first user and receive hyperspectral image data associated with the first user. The process may further be configured to extract, via a hyperspectral imaging module, one or more account credentials of the first user from the hyperspectral image data. Thereafter, the processor may be configured to effectuate the resource transfer associated with an account of the first user as defined by the one or more account credentials.

In some embodiments, the processor may be further configured to receive the hyperspectral image data in response to an image capturing operation performed by the hyperspectral imaging module.

In some embodiments, the hyperspectral image data may be indicative of a hyperspectral image supported by a resource transfer object.

In some embodiments, the one or more extracted account credentials of the first user may be encrypted, the hyperspectral imaging module may be further configured to decrypt the encrypted account credentials.

In some further embodiments, the one or more account credentials are encrypted via one or more homomorphic techniques.

In some embodiments, the hyperspectral image data may include one or more unique hypercube objects.

In some embodiments, prior to effectuating the resource transfer, the processor may be further configured to authenticate the first user based upon the one or more extracted account credentials of the first user.

In another aspect, a computer program product for hyperspectral imaging based electronic authentication resource transfers is provided. The computer program product may include a non-transitory computer-readable medium comprising code causing an apparatus to receive a resource transfer request associated with at least a first user, receive hyperspectral image data associated with the first user, extract, via a hyperspectral imaging module, one or more account credentials of the first user from the hyperspectral image data, and effectuate the resource transfer associated with an account of the first user as defined by the one or more account credentials.

In another aspect, a method for hyperspectral imaging based electronic authentication resource transfers is provided. The method may include receiving a resource transfer request associated with at least a first user, receiving hyperspectral image data associated with the first user, extracting, via a hyperspectral imaging module, one or more account credentials of the first user from the hyperspectral image data, and effectuating the resource transfer associated with an account of the first user as defined by the one or more account credentials.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
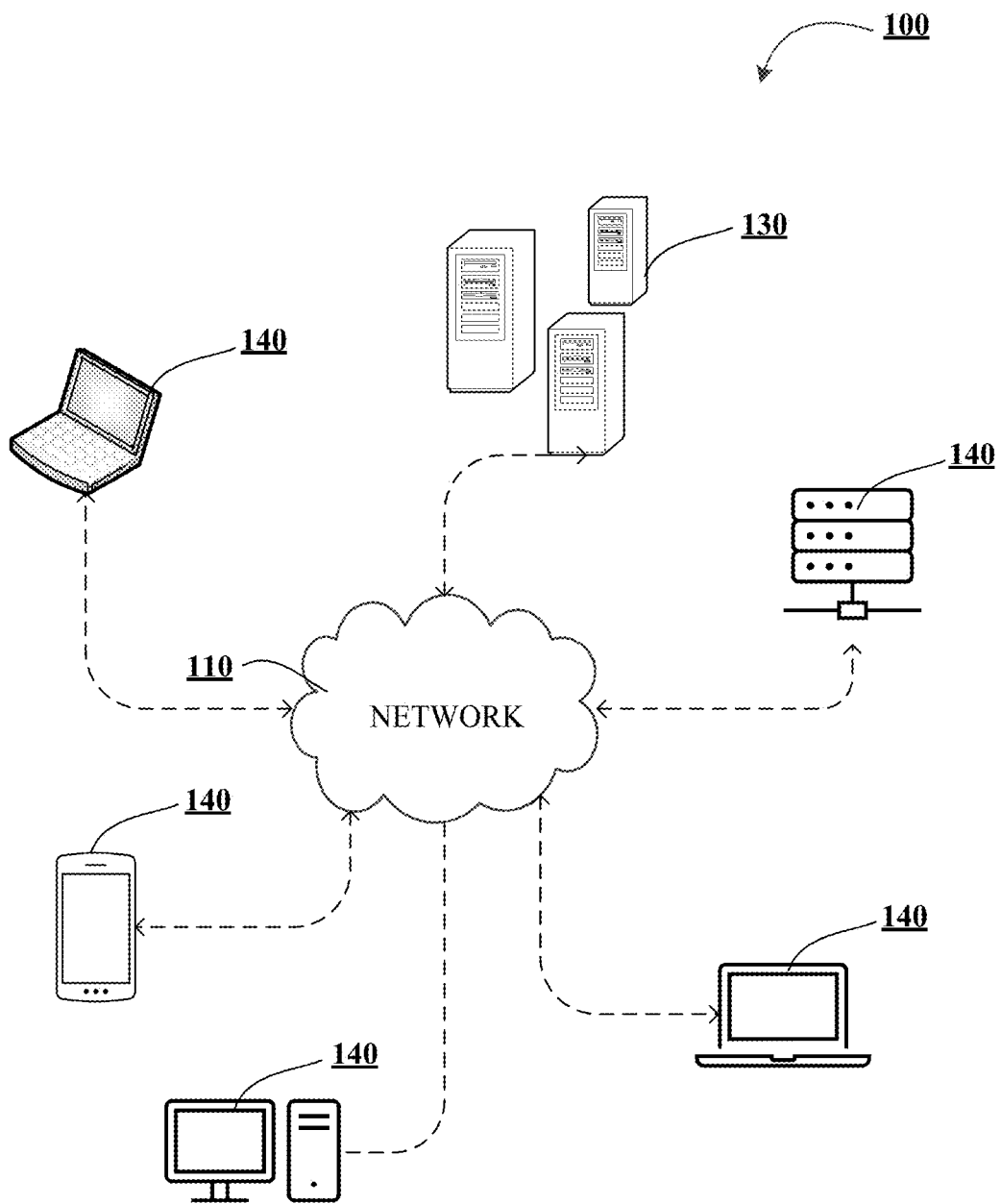
FIGS. 1A-1C illustrate technical components of an exemplary distributed computing environment for hyperspectral imaging based authentication and resource transfer in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity. Furthermore, the embodiments of the present disclosure are described hereafter with reference to a "first user" as an example "user." The present disclosure, however, contemplates that any number of users may be associated with a particular request for resource transfer, a particular entity, and/or the like. Furthermore, the embodiments described herein may be applicable to resource transfer requests that are associated with a plurality of users (e.g., a multi-party or user transaction).

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, resource transfer devices, objects, and systems are leveraged by a variety of industries in order to securely transmit resources (e.g., funds, information, etc.) between parties. For example, credit cards, debit cards, and other payment technologies (e.g., resource transfer systems) may, at least in part, operate to effectuate payment (e.g., transfer resources) between users, businesses, entities, and/or the like. In order to complete such a resource transfer (e.g., effectuate payment for a good or service), various characteristics, parameters, credentials, etc. of the parties to this resource transfer (e.g., transaction) are often required. By way of a particular example, in a transaction between a customer and an entity, the customer may provide a credit card or debit card (e.g., resource transfer object) in order to purchase a good or service offered by the entity.

Such a credit or debit card (e.g., resource transfer object) may include account credentials of the customer, such as the user's account number, card number, name, expiration date, security code, etc., that may be received by a device of the entity in order to effectuate payment. In conventional systems and interactions, these account credentials are viewable or otherwise presented unsecured to other parties (e.g., employees of the entity or the like). Not only do these conventional systems and interactions provide a security threat to the underlying account of the user, these interactions further expose confidential or private user information to unintended parties.

In order to solve these issues and others, embodiments of the present disclosure may leverage hyperspectral imaging techniques to secure user account credentials. For example, in issuing a credit card or debit card to a user (e.g., a resource transfer object), various account credentials of the associated user may be used to generate hyperspectral image data that is associated with these underlying account credentials. This hyperspectral image data may be used to generate a hyperspectral image that is, for example, applied to the credit or debit card of the user. In doing so, the account credentials of the user are secured from exposure to unintended parties. During an example transaction (e.g., resource transfer request), the hyperspectral image of the user's resource transfer object (e.g., credit card, debit card, etc.) may be scanned by a hyperspectral imaging device data that, in turn, generates hyperspectral image data. The embodiments described herein may extract the one or more account credentials of the user, authenticate the user/transaction, and effectuate the requested transaction while maintaining security for the user's account credentials.

Figure 1B:
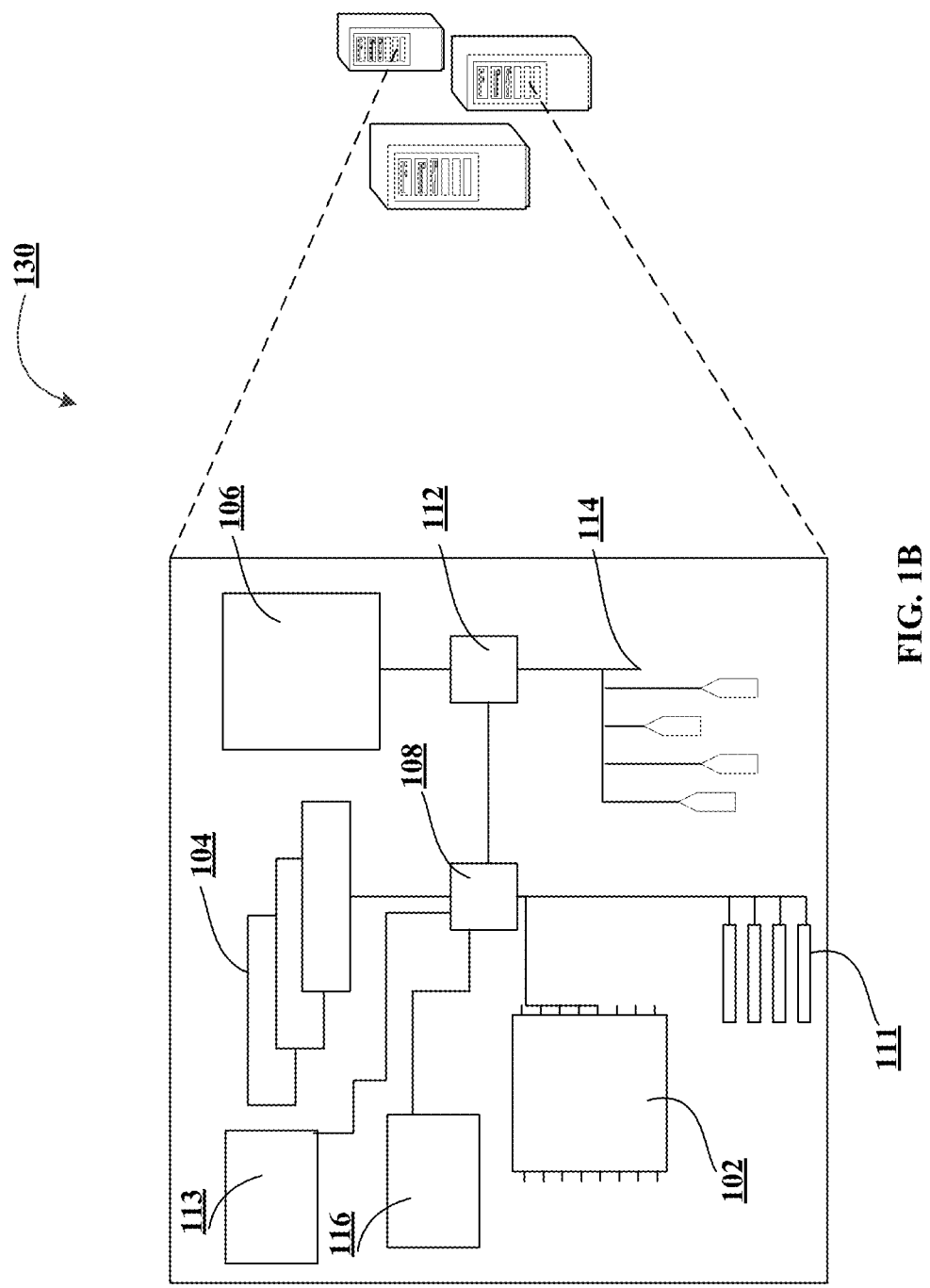
Figure 1C:
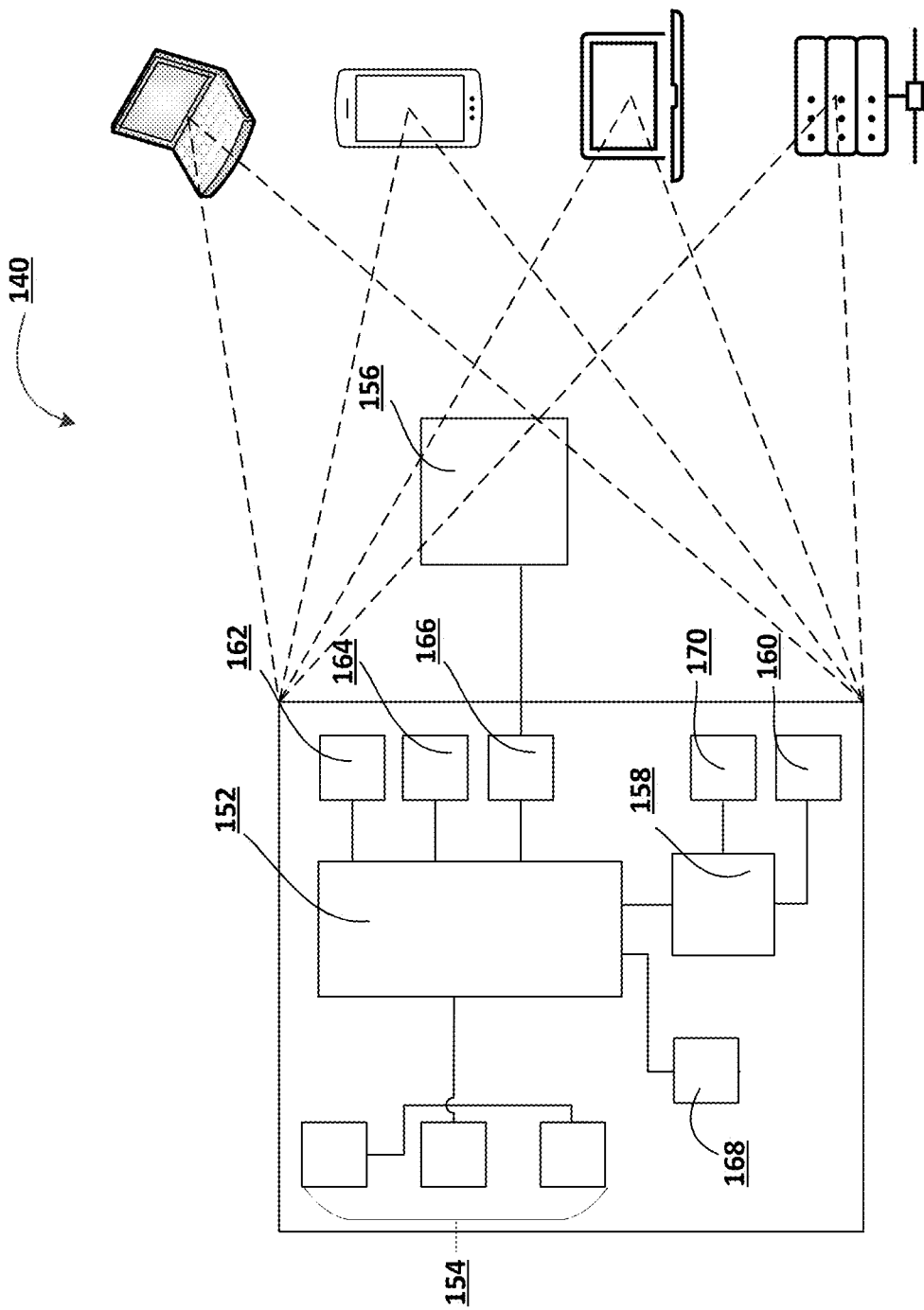

FIGS. 1A-1C illustrate technical components of an exemplary distributed computing environment for hyperspectral imaging based electronic authentication resource transfers 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, a storage device 110, and a hyperspectral imaging module 113. The system 130 may also include a high-speed interface 108 connecting to the memory 104, and a low-speed interface 112 connecting to low speed bus 114 and storage device 110. Each of the components 102, 104, 108, 110, 112, and 113 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), the hyperspectral imaging module 113, and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may further include a hyperspectral imaging module 113 configured to generate hyperspectral image data indicative of one or more account credentials of a user, such as in instances in which the hyperspectral imaging module 113 is used to generate a hyperspectral image for application to a resource transfer object (e.g., credit card, debit card, etc.). Furthermore, the hyperspectral imaging module 113 may be configured to extract one or more account credentials from hyperspectral image data so as to access this information in effectuating a resource transfer or other operation. As such, the hyperspectral imaging module 113 may include any imaging devices, such as a thermal imaging camera, an infrared (IR) imager, an IR camera, a thermographic camera, and/or any device configured to generate image data that includes radiation (e.g., light) having wavelengths/frequencies outside of the visible range. Said differently, the one or more hyperspectral imaging devices leveraged by the hyperspectral imaging module 113 may capture, collect, etc. image data from across the electromagnetic range at various continuous spectral bands. In doing so, the hyperspectral imaging module 113 may determine one or more spectral characteristics (e.g., reflectance or the like) associated with the hyperspectral image data for use in subsequent generation or extraction operations. The present disclosure contemplates that the hyperspectral imaging module 113 may include any number of associated filters configured to pass/attenuate radiation (e.g., light) having particular or selected wavelengths or frequencies based upon the intended application of the system 130.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker. In some embodiments, the end-point device(s) 140 may include, in whole or in part, the hyperspectral imaging module 113 or otherwise be configured to perform the operations described herein with reference to the hyperspectral imaging module 113.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Figure 2:
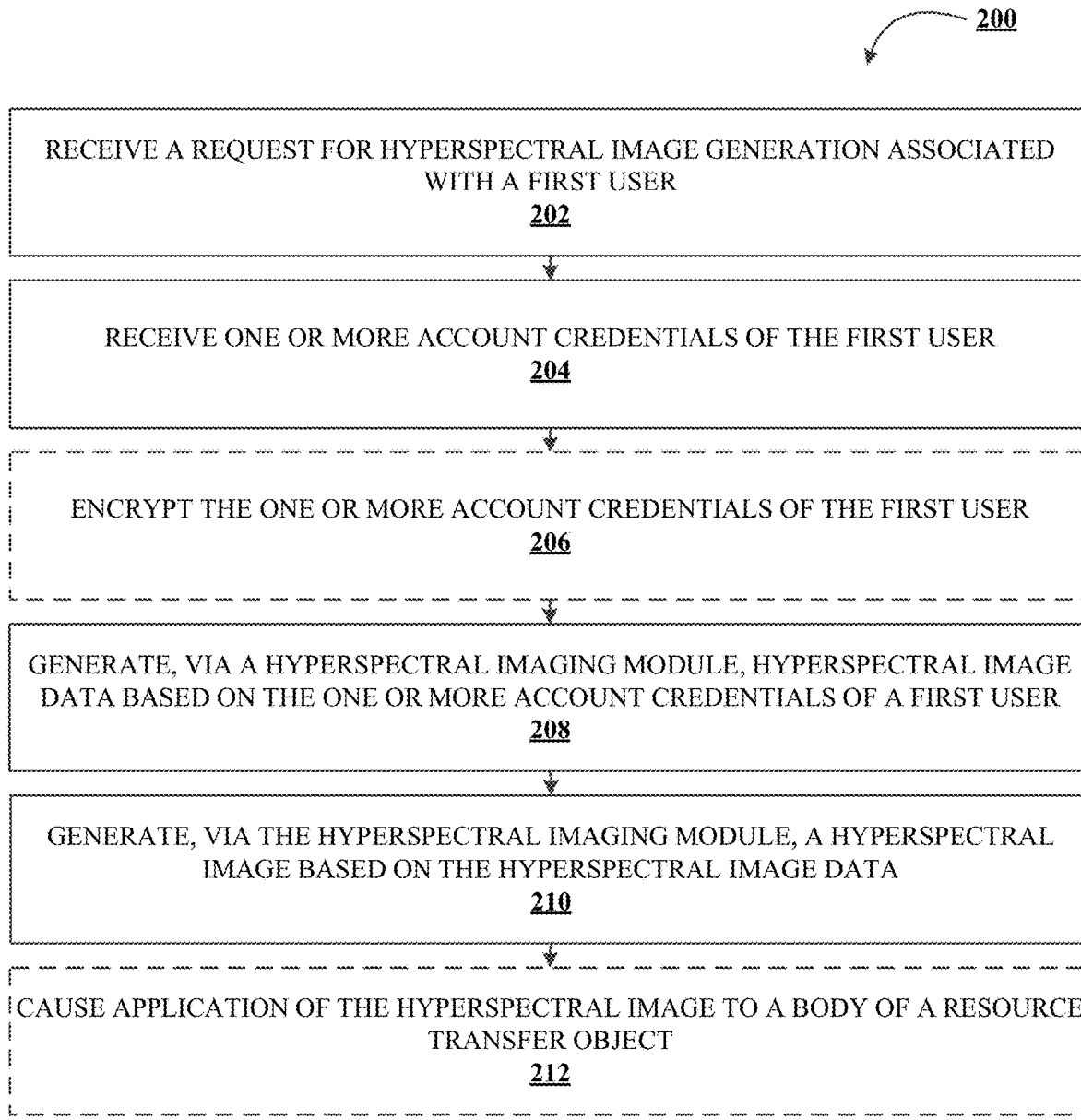
FIG. 2 illustrates a method for resource transfer with authentication based on hyperspectral imaging in accordance with one or more embodiments of the present disclosure.

FIG. 2 illustrates a flowchart containing a series of operations for example resource transfers with authentication based on hyperspectral imaging (e.g., method 200). The operations illustrated in FIG. 2 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, hyperspectral imaging module 113, processor 152, etc.).

As shown in operation 202, the system 130 may be configured to receive a request for hyperspectral image generation associated with a first user. As described above, the hyperspectral images described herein may operate to replace the explicit listing of user account credentials on example resource transfer objects (e.g., credit card, debit cards, etc.). As such, the request for the hyperspectral image generation at operation 202 may, for example, be received in response to the preparation of a new resource transfer object for issuance to the first user. By way of a particular example, the first user may, as part of a new account opening, prior resource transfer object expiration, and/or the like, request (e.g., explicitly or automatically) a new resource transfer object. This request may include a request for hyperspectral image generation in order to secure the account credentials of the first user. In other embodiments, the request for hyperspectral image data generation may be independent from resource transfer object preparation. The present disclosure further contemplates that the request received at operation 202 may be received by any device, system, user, etc. based upon the intended application of the system 130 described herein.

As shown in operation 204, the system 130 may be configured to receive one or more account credentials of the first user. As described above, the first user, the first user's account, etc. may be associated with various parameters, characteristics, attributes, credentials, and/or the like associated with use of this account. By way of a nonlimiting example, the account credentials of the first user may refer to the first user's name, address, phone number, birth date, account number, routing number, card number, card expiration date, security code, account password, account personal identification number (PIN), and/or any credential associated with the first user. In some embodiments, the first user may provide these account credentials to the system 130, such as via a user input at an end-point device 140. In other embodiments, the one or more account credentials may be received in response to accessing a data repository storing the one or more account credentials. By way of example, the system 130 may include various data repositories storing user data, such as user data generated from one or more interactions with the system 130. As such, the system 130 may, in some embodiments, access these repositories (e.g., via one or more queries or the like) to retrieve the one or more account credentials of the first user.

Thereafter, as shown in operation 206, the system 130 may, in some embodiments, encrypt the one or more account credentials of the first user. In order to further secure the user account credentials, the system 130 may leverage one or more cryptographic techniques to convert the user account credentials from, for example, plain/cleartext to, for example, ciphertext. The present disclosure contemplates that the encryption operations described herein may leverage any mechanism of encryption including ciphers (e.g., substitution, transposition, polygraphed), public key cryptography, private key cryptography, etc. In some embodiments, the system 130 may leverage quantum computing in order to encrypt the account credentials via post-quantum cryptographic techniques (e.g., quantum key distribution or the like). In other words, the system 130 may leverage any encryption technique or mechanism in order to encrypt the account credentials of the first user.

As would be evident to one of ordinary skill in the art in light of the present disclosure, the encryption of the account credentials of the first user may include converting the account credentials (regardless of form or format) into numerical values (e.g., a string of cyphertext or the like). Furthermore, in some embodiments, the encryption of the account credentials may be via one or more homomorphic techniques. Homomorphic encryption may refer to encryption techniques that allow a user, device, etc. to perform computations on encrypted data (e.g., encrypted account credentials) without first decrypting the credentials. In such an embodiment, the underlying account credentials may remain secured during a resource transfer operation by limiting access to the underlying account credentials.

Thereafter, as shown in operation 208, the system may generate, via the hyperspectral imaging module 113, hyperspectral image data based on the one or more account credentials of a first user. As described above, the hyperspectral imaging module 113 may include one or more hyperspectral imagers each configured to generate hyperspectral image data associated with the one or more account credentials including radiation (e.g., light) having wavelengths/frequencies outside of the visible range. Said differently, the hyperspectral image data may include image data from across the electromagnetic range at various continuous spectral bands. The hyperspectral imaging module may be configured to divide the hyperspectral image data into a plurality of continuous spectral bands as part of generating this data. For example, the hyperspectral imaging module 113 may generate image data at a plurality of wavelengths and/or frequencies for further processing as described herein.

As would be evident to one of ordinary skill in the art in light of the present disclosure, the hyperspectral imaging devices leveraged by the hyperspectral imaging module 113 may generate hyperspectral image data that includes a plurality of associated parameters, characteristics, attributes, etc. in order to properly encode the account credentials of the user. As described herein, hyperspectral images may refer to a visual representation of hyperspectral image data that is formed of, for example, a plurality of pixels. As such, the various characteristics of each of these pixels in the hyperspectral image may encode particular data of the first user (e.g., encode account credentials of the first user). By way of example, various spectral characteristics (e.g., reflectance, refractive, index, radiative intensity, or the like) at various wavelengths (e.g., in the visible spectrum, IR spectrum, etc.) may be used to encode the account credentials of the first user. For example, the hyperspectral image data may include one or more unique hypercube objects. As would be evident to one of ordinary skill in the art, the hypercube objects described herein may refer to three-dimensional data sets that include two spatial dimensions and one spectral dimension. The present disclosure contemplates that any attribute, characteristic, parameter, etc. of a resulting hyperspectral image may be varied by the hyperspectral image data generated at operation 208 based upon the intended application of the system 130 and/or the nature of the account credentials of the first user.

Thereafter, as shown in operation 210, the system 130 may generate, via the hyperspectral imaging module 113, a hyperspectral image based on the hyperspectral image data. As described above, the hyperspectral image may refer to the visual representation of the hyperspectral image data. As such, the hyperspectral image may include a plurality of pixels where the attributes, characteristics, etc. of at least a portion of the pixels are used to encode, represent, or otherwise be indicative of the account credentials of the user, such as when an image capturing operations occurs as described hereafter with reference to FIG. 3. In some embodiments, the generation of the hyperspectral image may occur concurrently with the generation of the hyperspectral image data at operation 208.

In some embodiments, as shown in operation 212, the system may further cause application of the hyperspectral image to a body of a resource transfer object. As described above, the first user may, in some embodiments, be associated with a resource transfer object, such as a credit card, a debit card, or similar payment technologies. In such an embodiment, the system 130 may cause, via a printing device or the like, the hyperspectral image generated at operation 210 to be applied to the body of such a resource transfer object. For example, the hyperspectral image may be printed on a surface of an example debit card (e.g., resource transfer object). The present disclosure contemplates that the application of the hyperspectral image on the resource transfer object may occur by any technique or mechanism so long as the hyperspectral image may be viewed by a hyperspectral imaging device as described hereafter with reference to FIG. 3.

Figure 3:
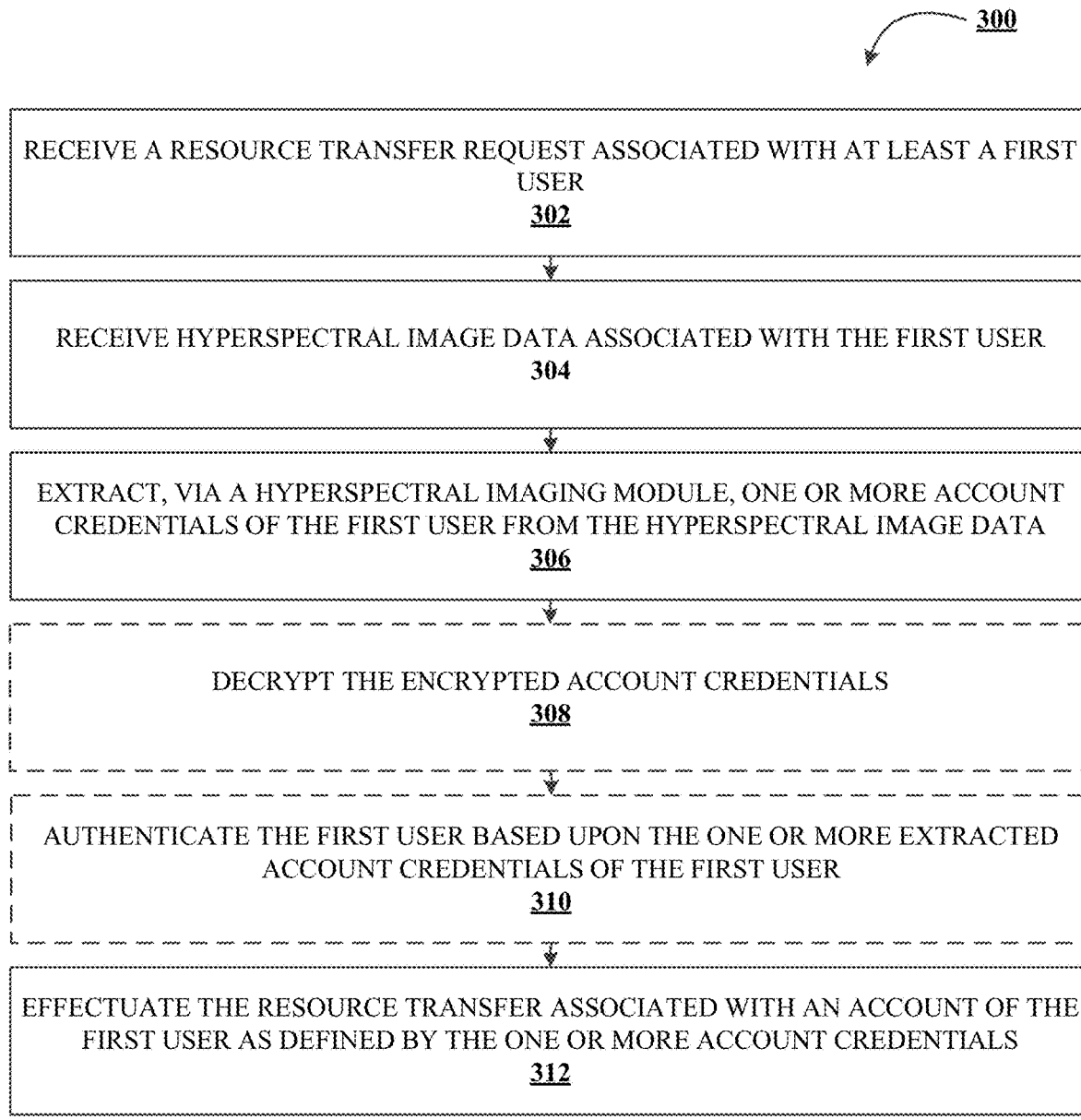
FIG. 3 illustrates a method for hyperspectral imaging based electronic authentication resource transfers in accordance with one or more embodiments of the present disclosure.

FIG. 3 illustrates a flowchart containing a series of operations for hyperspectral imaging based electronic authentication resource transfers (e.g., method 300). The operations illustrated in FIG. 3 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, hyperspectral imaging module 113, processor 152, etc.).

As described above with reference to FIG. 2, the embodiments described herein may use hyperspectral imaging techniques to generate hyperspectral images that reduce or eliminate the security threat to underlying user data in resource transfer operations. With reference to FIG. 3, operations for effectuating a resource transfer via these hyperspectral images is illustrated. As shown in operation 302, the system 130 may receive a resource transfer request associated with at least a first user. In some embodiments, the system 130 may receive the request for resource transfer in response to an operation that includes a resource transfer object. By way of example, a debit card associated with the first user may be received by a POS device as part of a transaction. By way of a more particular example, the example POS device may include a hyperspectral imaging device configured to generate hyperspectral image data in response to an image capture operation by the hyperspectral imaging device. In other words, the receipt of a hyperspectral image supported by a resource transfer object (e.g., credit card, debit card, etc.) may generate a resource transfer request (e.g., a request for payment) that is subsequently received by the system 130.

As shown in operation 304, the system 130 may receive hyperspectral image data associated with the first user. In some embodiments, operation 304 may occur concurrently with operation 302 in that the request for resource transfer includes the hyperspectral image associated with the first user. As described above, the hyperspectral image may refer to the visual representation of the hyperspectral image data. As such, the hyperspectral image may include a plurality of pixels where the attributes, characteristics, etc. of at least a portion of the pixels are used to encode, represent, or otherwise be indicative of the account credentials of the user. When an image capturing operation occurs by one or more hyperspectral imaging device of the hyperspectral imaging module 113, the system 130 may receive the hyperspectral image data. In some embodiments, the image capturing operations may occur by hyperspectral imaging devices at the end-point device 140 such that operation 304 refers to a transmission of the hyperspectral image data to the system 130. In other embodiments, the hyperspectral image may be provided to the system 130 and the hyperspectral imaging module 113 may generate the hyperspectral image data.

Thereafter, at operations 306, the system 130 may extract, via a hyperspectral imaging module, one or more account credentials of the first user from the hyperspectral image data. As described above with reference to operation 208, the hyperspectral imaging module 113 may generate hyperspectral image data that includes a plurality of associated parameters, characteristics, attributes, etc. in order to properly encode the account credentials of the user. As such, the various characteristics of each of these pixels in the hyperspectral image may encode particular data of the first user (e.g., encode account credentials of the first user). By way of example, various spectral characteristics (e.g., reflectance, refractive, index, radiative intensity, or the like) at various wavelengths (e.g., in the visible spectrum, IR spectrum, etc.) may be used to encode the account credentials of the first user. At operation 306, the hyperspectral imaging module 133 may perform the opposite operation by extracting the underlying account credentials from the various characteristics of the hyperspectral image data.

In some embodiments, as shown in operations 308, 310, the account credentials of the first user may be encrypted. As described above with reference to operation 206, the system 130 may leverage one or more cryptographic techniques to convert the user account credentials from, for example, plain/cleartext to, for example, ciphertext. The present disclosure contemplates that the encryption operations described herein may leverage any mechanism of encryption including ciphers (e.g., substation, transposition, polygraphed), public key cryptography, private key cryptography, etc. At operation 308, the system 130 may, via the cipher, encryption key(s), etc. used to encrypt the account credentials, decrypt the user account credentials of the first user (e.g., from ciphertext to clear/plain text). The system 130 may leverage any decryption technique or mechanism in order to decrypt the account credentials of the first user.

In some embodiments, as shown in operation 310, the system 130 may authenticate the first user based upon the one or more extracted account credentials of the first user. By way of example, the account credentials of the first user may be compared against various data repositories of the system 130 to confirm that the credentials are associated with the correct user (e.g., the first user) and/or a request for resource transfer associated with the first user. In some instances, a notification may be provided to the first user (e.g., a user device of the first user) requesting confirmation of the resource transfer request. In some embodiments, the account credentials are encrypted via homomorphic techniques. In such an embodiment, the decryption of operation 308 may be unnecessary as the first user may be authenticated without revealing the underlying account credential data.

Thereafter, as shown in operation 312, the system 130 may effectuate the resource transfer associated with an account of the first user as defined by the one or more account credentials. By way of example, the system 130 may be associated with a financial institution that maintains the financial accounts of the first user. In such an embodiment, the system 130 may, for example, cause resources (e.g., funds) to be transferred from the account of the first user to an account associated with the resource transfer request. Although described herein with reference to effectuating resource transfers in the form of funds, the present disclosure contemplates that any resource (e.g., data, signals, information, etc.) may be transferred by the embodiments described herein.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A hyperspectral imaging system for electronic authentication resource transfers, the system comprising:
    at least one non-transitory storage device; and
    at least one processor coupled to the at least one non-transitory storage device, wherein the at least one processor is configured to:
        receive a resource transfer request associated with at least a first user, wherein the first user is associated with one or more account credentials;
        generate hyperspectral image data based on a hyperspectral image associated with the first user;
        determine one or more unique hypercube objects formed of a plurality of pixels based on the hyperspectral image data;
        determine one or more spectral characteristics of at least a portion of the pixels of the one or more unique hypercube objects that encode the one or more account credentials of the first user;
        extract the one or more account credentials of the first user from the one or more spectral characteristics of the pixels of the one or more unique hypercube objects of the hyperspectral image data;
        determine that the one or more extracted account credentials of the first user are encrypted via one or more homomorphic techniques;
        authenticate the first user based upon the one or more extracted account credentials of the first user while maintaining encryption of the one or more encrypted account credentials; and
        effectuate the resource transfer associated with an account of the first user associated with the one or more account credentials.

2. The system of claim 1, wherein the at least one processor is further configured to generate the hyperspectral image data as part of an image capturing operation.

3. The system of claim 1, wherein the hyperspectral image data is indicative of the hyperspectral image supported by a resource transfer object.

4. A computer program product for hyperspectral imaging based electronic authentication resource transfers, the computer program product comprising a non-transitory computer-readable medium comprising code causing an apparatus to:

receive a resource transfer request associated with at least a first user, wherein the first user is associated with one or more account credentials;

generate hyperspectral image data based on a hyperspectral image associated with the first user;

determine one or more unique hypercube objects formed of a plurality of pixels based on the hyperspectral image data;

determine one or more spectral characteristics of at least a portion of the pixels of the one or more unique hypercube objects that encode the one or more account credentials of the first user;

extract the one or more account credentials of the first user from the one or more spectral characteristics of the pixels of the one or more unique hypercube objects of the hyperspectral image data;

determine that the one or more extracted account credentials of the first user are encrypted via one or more homomorphic techniques;

authenticate the first user based upon the one or more extracted account credentials of the first user while maintaining encryption of the one or more encrypted account credentials; and effectuate the resource transfer associated with an account of the first user associated with the one or more account credentials.

5. The computer program product of claim 4, wherein the apparatus is further configured to generate the hyperspectral image data as part of an image capturing operation.

6. The computer program product of claim 4, wherein the hyperspectral image data is indicative of the hyperspectral image supported by a resource transfer object.

7. A method for hyperspectral imaging based electronic authentication resource transfers, the method comprising:

receiving a resource transfer request associated with at least a first user, wherein the first user is associated with one or more account credentials;

generating hyperspectral image data based on a hyperspectral image associated with the first user;

determining one or more unique hypercube objects formed of a plurality of pixels based on the hyperspectral image data; and determining one or more spectral characteristics of at least a portion of the pixels of the one or more unique hypercube objects that encode the one or more account credentials of the first user;

extracting the one or more account credentials of the first user from the one or more spectral characteristics of the pixels of the one or more unique hypercube objects of the hyperspectral image data;

determining that the one or more extracted account credentials of the first user are encrypted via one or more homomorphic techniques;

authenticating the first user based upon the one or more extracted account credentials of the first user while maintaining encryption of the one or more encrypted account credentials; and effectuating the resource transfer associated with an account of the first user associated with the one or more account credentials.

8. The method of claim 7, wherein the hyperspectral image data is generated as part of an image capturing operation.

9. The method of claim 7, wherein the hyperspectral image data is indicative of the hyperspectral image supported by a resource transfer object.

10. The system of claim 1, wherein the one or more spectral characteristics comprise a reflectance of the pixels.

11. The system of claim 10, wherein the one or more spectral characteristics are determined at various wavelengths.

12. The computer program product of claim 4, wherein the one or more spectral characteristics comprise a reflectance of the pixels.

13. The computer program product of claim 12, wherein the one or more spectral characteristics are determined at various wavelengths.

14. The method of claim 7, wherein the one or more spectral characteristics comprise a reflectance of the pixels.

15. The system of claim 1, wherein the one or more spectral characteristics comprise a refractive index of the pixels.

16. The system of claim 1, wherein the one or more spectral characteristics comprise a radiative intensity of the pixels.

17. The computer program product of claim 4, wherein the one or more spectral characteristics comprise a refractive index of the pixels.

18. The computer program product of claim 4, wherein the one or more spectral characteristics comprise a radiative intensity of the pixels.

19. The method of claim 7, wherein the one or more spectral characteristics comprise a refractive index of the pixels.

20. The method of claim 7, wherein the one or more spectral characteristics comprise a radiative intensity of the pixels.

* * * * *